UNITED STATES PATENT OFFICE 2,188,887

OILY DISPERSION MATERIAL

Edwin T. Clocker, Bethlehem, Pa.

No Drawing. Application September 26, 1938, Serial No. 231,761

16 Claims. (Cl. 134—24)

My invention relates to dispersions of oily materials such as oils, fats and waxes produced by an improved condensation product.

This application is a continuation in part of my copending application Serial No. 165,898, filed September 27, 1937, which is in turn a continuation in part of my copending applications Serial No. 759,086, filed December 24, 1934 and Serial No. 117,243, filed December 22, 1936 all for Condensation product and method. Serial No. 759,086 includes the generic claims and certain species relating to the condensation of an acyclic olefinic acid having less than ten carbon atoms in the carbon chain, or its ester, with a nonconjugated unsaturated nonhydroxylated aliphatic acid having from ten to twenty-four carbon atoms in the carbon chain, or a salt or ester thereof. Serial No. 117,243 relates particularly to the maleic species. Serial No. 165,898 relates to salts and esters of the condensation product. Serial No. 165,899, filed September 27, 1937, for Condensation product and method, includes the subject matter relating to recondensation. Serial No. 165,900, filed September 27, 1937, for Coating product and method is concerned with coating.

Serial No. 235,252, filed October 15, 1938, for Condensation product and method, is directed particularly to the condensation of oleic acid and its compounds. Serial No. 231,760, filed September 26, 1938, for Condensation product and method is directed to water-insoluble metallic salts of the condensation product. Serial No. 231,759, filed September 28, 1938, for Condensation product and method relates to a colored condensation product formed by reacting the acidic condensation product with a basic dyestuff.

A purpose of my invention is to produce a dispersion of an oily material such as an oil, fat or wax by use of a water-soluble salt of a condensation product of an acyclic olefinic acid having less than ten carbon atoms in its carbon chain and one of a group consisting of nonconjugated unsaturated nonhydroxylated aliphatic acids having from ten to twenty-four carbon atoms in their carbon chains, nonhydroxylated salts thereof and nonhydroxylated esters thereof or similar compounds.

A further purpose is to produce a dispersion of an oily material such as an oil, fat or wax by a soluble salt of the condensation product of one molecular equivalent of acyclic olefinic acid having less than ten carbon atoms in its carbon chain and one molecular equivalent of nonconjugated unsaturated nonhydroxylated carbon chain compound having from ten to twenty-four carbon atoms in the chain.

A further purpose is to condense an acyclic olefinic acid having less than ten carbon atoms in its carbon chain, such as maleic anhydride, with an oil predominantly consisting of glycerides of linoleic and oleic acids, such for example as an oil of the linseed type, of the perilla type or of the olive type, and to form oily dispersions with the aid of the condensation product.

A further purpose is to produce an improved dispersion by a water-soluble compound consisting of the completed salt, the acid salt or the salt-ester of the condensation product of an acyclic olefinic acid having less than ten carbon atoms in the carbon chain and a nonconjugated unsaturated nonhydroxylated aliphatic acid having from ten to twenty-four carbon atoms in the carbon chain, or similar compound.

A further purpose is to create polishes such as automobile polishes, shoe polishes, furniture polishes, and leather polishes and wetting or softening agents for use in the textile, leather, paper, printing ink, and rubber industries, and bodying agents for use in the polishing, cutting and cosmetic industries, by mixing an oily material with a dispersing agent produced according to the invention and dispersing the mixture of dispersing agent and oily material.

A further purpose is to produce a permanent dispersion in water of a paint, varnish, or lacquer oil such as linseed oil by using a soluble dispersing agent of the present invention, and thus maintain the coating oil in permanent dispersion for application in water medium.

A further purpose is to use dispersions of the condensation product of the present invention and an oily material for detergent, cleaning and lubricating purposes.

Further purposes appear in the specification and in the claims.

It has been known for some time that maleic anhydride or substances yielding maleic anhydride will condense with carbon chain compounds containing a conjugated system of double bonds. For example, Morrell, Marks and Samuels in British patent No. 407,957 discloses a condensation of maleic anhydride with tung oil, a conjugated compound.

I have discovered that, under suitable conditions, maleic anhydride and compounds which behave similarly, as discussed below will react with nonconjugated unsaturated nonhydroxylated fatty oils and acids and similar compounds having from ten to twenty-four carbon atoms in the carbon chain and the condensation product thus obtained may be formed into a water-soluble salt.

To produce the maleic condensation product the maleic grouping must be present in condensable form, preferably as maleic anhydride. The condensation is of course obtained from any of the compounds which yield maleic anhydride and the like, such as malic acid, fumaric acid, maleic acid, aconitic acid or citric acid, if subjected to the conditions under which maleic anhydride is produced. The production of maleic anhydride from such other acids is well known in the art (Bernthsen, Textbook of Organic Chemistry (1923) pages 250-256). Instead of maleic anhydride, an acid ester of maleic anhydride, or a substituted maleic acid having less than ten carbon atoms in its carbon chain may be used.

As explained herein, in order to avoid a mere esterification of alcohol groups, as distinguished from a condensation at the double bond, the oil or similar compound should be nonhydroxylated. Where necessary, precautions should be used to avoid hydroxylation by hydrolysis or otherwise. As well known in the art, in order to prevent or minimize hydrolysis, the reacting components should be reasonably dry, and water formed by decomposition of a reacting ingredient during the reaction should be removed. For example, if maleic acid (as distinguished from the anhydride) is caused to react with an oil or similar compound, it is preferable to use a relatively high temperature to cause rapid reaction, and it is preferable to permit elimination of the water formed by decomposition of the maleic acid into maleic anhydride, as by permitting distillation and avoiding refluxing. Where maleic anhydride or a similar compound not producing water by decomposition is to be used, the desirability of avoiding refluxing of course ceases.

Wherever reference is made herein to maleic anhydride, it will be understood that I include substances which yield maleic anhydride if subjected to the conditions at which maleic anhydride is produced. I also include substituted maleic acids having less than ten carbon atoms in their carbon chains, and other equivalents.

Wherever I refer herein to an acid or to an acid group, I of course include an acid anhydride and an acid anhydride group, and vice versa. Wherever I refer to an ester, I include also a half ester.

Investigation of a large number of compounds has shown that condensation with a nonconjugated unsaturated nonhydroxylated aliphatic acid having from ten to twenty-four carbon atoms in the carbon chain is generally characteristic of acyclic olefinic acids having less than ten carbon atoms in the carbon chain, which are substituted at one or both sides of the double bond. These compounds have the ethylene linkage and are acyclic as they have no stable ring formation. Such olefinic compounds are mono-substituted when they contain only one acidic group; for example crotonic acid. Such olefinic compounds are di-substituted when they contain two acidic groups, for example maleic anhydride, citraconic anhydride, maleic acid, acid methyl maleate.

The longer the carbon chain of the acyclic olefinic acid, acid anhydride, half ester or the like, the less vigorous is the condensation reaction. Thus at the upper limit (nine carbon atoms in the carbon chain) the reaction is relatively mild. If there are less than seven carbon atoms in the carbon chain (for example six) the reaction is more vigorous. A still more vigorous reaction is obtained if there are less than five carbon atoms in the carbon chain. In the case of an ester of any olefinic compound, the carbon chain of the olefinic compound should have less than ten carbon atoms, the carbon chain of the compound added by esterification not being counted.

In all cases where I refer in the specification to less than ten carbon atoms in the carbon chain of the olefinic compound, it will be understood that a more vigorous reaction is obtained with compounds having less than seven carbon atoms in the carbon chain, and a still more vigorous reaction with compounds having less than five carbon atoms in the carbon chain. These latter groups (less than seven and less than five) are to be taken as expressly included, although not specifically mentioned because of a desire to shorten the specification.

It will of course be apparent that an attempt to condense maleic anhydride or the like with a nonconjugated unsaturated hydroxylated aliphatic acid having from ten to twenty-four carbon atoms in the carbon chain, or a salt or ester thereof, will result in esterification between the acidic group of maleic anhydride and the hydroxyl group or groups in the aliphatic acid, salt or ester. Condensation between the maleic anhydride or the like and the carbon chain of the hydroxylated aliphatic acid, salt or ester, will only take place after esterification is complete, and in case maleic anhydride or the like in excess of that consumed by the esterification is present in contact with the esterified hydroxylated aliphatic acid, salt or ester under the proper conditions.

The esterification of course produces a change in properties, and the condensation product of a hydroxylated aliphatic acid, salt or ester can in general be given properties comparable with those of the condensation product of a nonhydroxylated aliphatic acid, salt, or ester, only by destroying the esterification of the maleic anhydride or the like, as by hydrolysis.

Due to the difficulty in obtaining a condensation reaction between maleic anhydride or the like and a nonconjugated unsaturated hydroxylated aliphatic acid having from ten to twenty-four carbon atoms in the carbon chain, due to the change in properties caused by esterification, and due to the difficulty of decomposing the ester, the claims have generally been drawn to exclude hydroxylated aliphatic acids, salts and esters. This means that such acids, salts and esters are not sufficiently hydroxylated to interfere with the condensation by esterification. Oils which are polymerized by blowing with air are usually hydroxylated.

In those cases where the claims do not exclude hydroxylated aliphatic acids, salts and esters, it will be understood that more than mere esterification is intended there should be condensation at a point of unsaturation on the carbon chain of the acid, salt or ester.

As will be later explained in considerable detail, the presence of the acid or acid anhydride radical in the condensation product is distinctly advantageous, because of the reaction of which the acid or acid anhydride radical is capable and the uses to which such reactions may be put.

A wide variety of nonconjugated unsaturated nonhydroxylated carbon chain compounds having from ten to twenty-four carbon atoms in the carbon chain may be employed. Esters of fatty acids with mono-, di- or poly-hydric alcohols, for example glyceryl or glycol esters, are particularly desirable. The free fatty acid may also be used. Salts of the fatty acids (soaps) may likewise be employed.

When reference is made to the length of the carbon chain as being from ten to twenty-four carbon atoms, it is intended to include compounds having ten carbon atoms, twenty-four carbon atoms or any intermediate number of carbon atoms in the chain. The reference to the length of the carbon chain applies to the carbon chain of the acid. A glyceride, for example, contains three such carbon chains united to a glyceryl group.

As examples of the type of nonconjugated unsaturated nonhydroxylated aliphatic acids having from ten to twenty-four carbon atoms in the carbon chain which I use to advantage, I suggest oleic, linoleic, linolenic, clupanodonic and undecylenic. The esters of the nonhydroxylated fatty acids are either glyceryl esters, which form oils such as corn, olive, cotton seed, peanut, linseed, sunflower, safflower, perilla, hemp seed, walnut seed, soya bean, rape seed, tomato seed, neat's foot, lard, codliver, cod, burbet, salmon, menhaden, and many others, all nonconjugated unsaturated nonhydroxylated fatty oils; or esters of other alcohols, for example glycol esters. It will furthermore be understood that mixtures of various esters, or of the esters and the free fatty acids, or of salts of the acids, are employed if desired.

When I refer to the grouping of a nonconjugated unsaturated nonhydroxylated aliphatic acid having from ten to twenty-four carbon atoms in the carbon chain, I mean to include the acid and compounds of the acid such as esters of the acid, whether with mono-, di- or poly-hydric alcohols, and salts of the acid. I do not include herein hydroxylated aliphatic acids, oils, etc., because, while the condensation of my invention may in certain cases be obtained with them, special precautions must be taken because of the tendency of hydroxylated fatty acids, oils, etc., to esterify and gel. A typical hydroxylated fatty oil is castor oil.

The question of whether the free fatty acid or the ester or the salt is used is immaterial from the standpoint of the condensation reaction because the condensation reaction with the maleic anhydride appears to involve the carbon chain at an intermediate point between its ends, rather than the carboxyl group or neutralized carboxyl group at the end of the chain. Of course, the character of the product will vary depending upon whether the acid, ester or salt is used.

In the condensation, I will desirably employ one molecular equivalent of nonconjugated unsaturated nonhydroxylated aliphatic acid or the like to one molecular equivalent of acyclic olefinic acid and subject the mixture to a temperature of between 150° C. and 300° C. (more desirably between 180° C. and 260° C.) and preferably also to high pressure to facilitate the reaction. The temperature will in some cases be somewhat above 300° C. if the reacting components can stand such high temperature. Pressure will desirably be applied by simply confining the reaction components between the walls of some vessel such as a pressure autoclave and then heating the reaction components. Under such conditions the reaction components are under a pressure equal to their own vapor pressure at the reaction temperature. Pressure may also be applied in any other suitable way, as by pumping the reaction components into the vessel or introducing an inert gas under pressure. I have used pressures up to 300 pounds per square inch with success. Of course the desirable pressure will vary with the individual reaction.

The time of reaction will depend upon the temperature, the pressure, the concentration and the character of the reactants. In general where the reactions are carried out under atmospheric pressure, the minimum times of reaction are:

| Temperature | Minimum time |
| --- | --- |
| 150° C | Several hours. |
| 200° C | One hour. |
| 230° C | Thirty minutes. |
| 250° C | Twenty minutes. |
| 300° C | Ten minutes. |

Naturally to assure good results at any of these temperatures, the period of reaction will be at least two or three times the minimum.

A suitable catalyst may be used to accelerate the reaction and to increase the yield. I do not, however, find that a catalyst is necessary.

The condensation reaction may be carried out in the presence of suitable solvents, although this is not usually necessary.

In ordinary practice I prefer not to use sufficient acyclic olefinic acid having less than ten carbon atoms in the carbon chain to saturate all of the double bonds in the fatty acid or fatty oil, etc., having from ten to twenty-four carbon atoms in the carbon chain. The condensation product thus ordinarily has an iodine value. Generally it is sufficient to saturate one-sixth to one-third of the double bonds in the fatty acid, fatty oil, etc. Thus in olive oil one-third of the double bonds (one) is ordinarily saturated, and in linseed oil one-sixth (one). But in individual cases it will be desirable to saturate more ethylene linkages in the fatty acid or fatty oil, and even to completely saturate them. To saturate all of the ethylene linkages in linseed oil, six molecular equivalents of olefinic compounds having less than ten carbon atoms in the carbon chain are caused to react with one molecular equivalent of linseed oil.

Examples 1 to 5 given below, clearly indicate the way in which my improved condensation product is obtained.

*Example 1*

In a pressure autoclave, 180 parts by weight of raw alkali-refined linseed oil are mixed with 20 parts by weight of maleic anhydride. The temperature is maintained at from 230° C. to 260° C. for one hour, a pressure of about 30 pounds per square inch developing. The reaction will be obtained satisfactorily at 150° C., but is much slower at this low temperature, and the temperature can be raised to as much as 300° C. or even somewhat higher, but a high temperature may cause some difficulty due to carbonization. After cooling, the reaction product is removed from the autoclave. The condensation product is slightly darker and more viscous than the original linseed oil. It is soluble in acetone, ethyl acetate, ether, xylene, carbon tetrachloride, higher petroleum hydrocarbons and turpentine; and semi-soluble in 95% ethyl alcohol. The condensation product is miscible with fatty oils and solutions of cellulose derivatives such as nitrocellulose in all proportions. The iodine value is 141.4, as against 190.0 for the original linseed oil. The saponification value is 288 and the acid value is 52.9, in the presence of ethyl alcohol.

Example 2

Into a three-neck flask, equipped with a thermometer, mechanical stirrer and reflux condenser, 200 parts by weight of distilled oleic acid and 60 parts by weight of maleic anhydride are placed and heat is applied until the temperature of the mixture reaches 180° C.

The temperature is gradually raised from 180° C. to 250° C. over a period of one hour, during which time the amount of maleic anhydride condensed by the reflux condenser progressively diminishes. The temperature is maintained at 250° C. to 260° C. until no more maleic anhydride appears to condense under the reflux. The temperatures given are those found best for carrying out the reaction, although temperatures between 150° C. and 300° C., or even somewhat higher, will be used.

This condensation product is soluble in ethyl alcohol, ether, xylene, carbon tetrachloride and solutions of cellulose derivatives such as nitrocellulose, but is substantially insoluble in petroleum hydrocarbons and fatty oils.

Example 3

To 180 parts by weight of linseed oil are added 25 parts by weight of citraconic anhydride (a substituted maleic anhydride) and the mixture is heated in a three-neck flask, equipped with a reflux condenser, at about 250° C. for about three-quarters of an hour. At the end of this period, no further citraconic anhydride appears to condense under the reflux, indicating completion of the reaction. As a precaution, heating is continued for about 15 minutes longer. The reaction product is less viscous than the maleic condensation product of linseed oil obtained in Example 1, but has the same properties otherwise.

Example 4

A mixture of 25 parts by weight of linseed oil and 2.4 parts by weight of crotonic acid (an olefinic acid) are heated under pressure at about 250° C. for about two hours. The condensation product has similar properties to the maleic-linseed oil condensation product obtained in Example 1 as respects solubility above noted, and dispersing power, drying action and adherence to metals.

Example 5

A mixture of 900 parts by weight of linseed oil and 112 parts by weight of acid methyl maleate (a maleic half ester) are heated under pressure at about 250° C. for about two hours. If neutralized with an alkali, the reaction product forms an excellent dispersing agent as later explained.

My novel condensation product is made with nonconjugated unsaturated nonhydroxylated drying, semidrying or nondrying fatty oils having from ten to twenty-four carbon atoms in the carbon chain, or mixtures of the same, and the characteristics of the product are, to some extent, dependent upon the character of the oils or the like employed in the reaction. Where oils are used in the present invention, they will in most cases predominantly consist of glycerides of linoleic and oleic acids.

Without limiting myself to any exact structure for the condensation product, it would appear that the condensation product is an addition product at a double bond in the carbon chain of the oleic acid material. For example if oleic acid reacts with maleic anhydride, the reaction may be as follows:

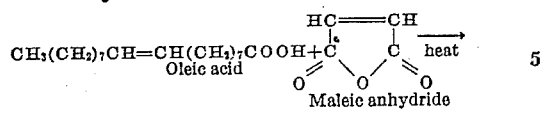

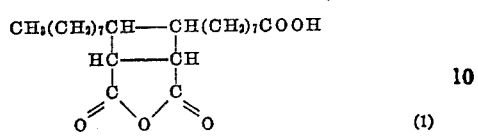

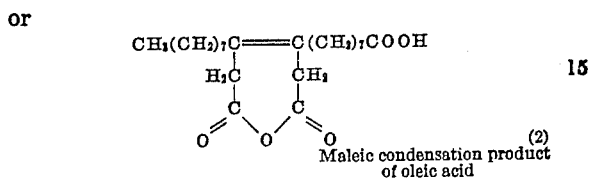

Of the above possible formulae, Formula 2, produced by molecular rearrangement of Formula 1, appears to be supported by the weight of the evidence as far as the condensation with oleic acid and its glycerides is concerned.

The reaction above will be modified in well known manner if a glyceryl ester of oleic acid instead of oleic acid be used, or if some other acyclic olefinic acid having less than ten carbon atoms in its carbon chain, be used instead of or in mixture with maleic anhydride.

It should be noted that the acyclic olefinic acid or acid anhydride condensation product of oleic acid or any similar acid has a carboxyl group capable of reacting at the end of the oleic or other similar carbon chain and also an olefinic acid group capable of reacting. The condensation will take place notwithstanding that both of these groups have been esterified before the condensation reaction, but the presence of the unesterified polar-reactive groups is of great advantage for many purposes as later explained.

When maleic acid or a substance yielding maleic acid is condensed with a nonconjugated unsaturated nonhydroxylated fatty acid or the like, it appears to change to maleic anhydride and the maleic anhydride condensation product results.

Acid reactions

The condensation product of the invention forms a dispersing agent for dispersing solids and emulsifying liquids. I have discovered that such a desirable dispersing agent may be obtained by producing a soluble salt, acid salt or salt-ester of the condensation product of an acyclic olefinic acid having less than ten carbon atoms in its carbon chain and a nonconjugated unsaturated nonhydroxylated fatty acid or the like having from ten to twenty-four carbon atoms in its carbon chain. For dispersing purposes the soluble salt-ester of the maleic condensation product of a nonconjugated unsaturated nonhydroxylated nondrying fatty oil is preferable.

Experimenting upon the maleic anhydride condensation product of a nonconjugated unsaturated nonhydroxylated fatty oil having from ten to twenty-four carbon atoms in its carbon chain, I have found that the completed salt, in which the maleic grouping is combined with carboxyl groups neutralized by an alkali metal base, for instance potassium or sodium hydroxide, or an organic base such as triethylamine, is a satisfactory dispersing agent. The acid salt, in which one carboxyl group is not neutralized and another is neutralized by an alkali metal base or organic base, is likewise a satisfactory dispersing agent. Also, the salt-ester is satisfactory. The completed ester is not a good dispersing agent.

The alkali metal and organic base salts, acid salts and salt-esters of the condensation products of acyclic olefinic acids having less than ten carbon atoms in their carbon chains and nonconjugated unsaturated nonhydroxylated aliphatic acids having from ten to twenty-four carbon atoms in their carbon chains, salts thereof and esters thereof, all serve as desirable dispersing agents.

When reference is made in the claims to a salt in the present connection, it is intended to include completed salts, acid salts and salt-esters. The base used in forming the soluble salt may be an alkali metal base or an organic base.

In producing my desirable dispersing agent, I preferably esterify the maleic condensation product with the theoretical quantity of an aliphatic or aromatic alcohol to produce an acid ester and then neutralize the acid ester with a suitable base or alkali to form a soluble salt-ester. The resultant product is a water-soluble oil which may be mixed with other oily materials to produce an emulsion. Emulsions made in this way have been found to be very stable and very neutral. Such oily emulsions may be used to advantage instead of sulphonated oil emulsions because the stability, wettability, solubility and dispersion power of the dispersing agent obtained by my invention is greater than in the case of sulphonated oils. Emulsions produced by my dispersing agents have the further advantage over sulphonated oil emulsions that they are not decomposed, and particularly do not liberate an acid group as do the sulphonated oils, which liberate sulphuric acid upon decomposition.

Large quantities of sulphonated oils are now used for dispersing, wetting and softening agents in the textile, leather, paper, plaster, and cement industries. My improved product is according to tests by me superior to the commonly used sulphonated oils for use as a dispersing, wetting and softening agent in these and other industries. In the textile field, my product may be used in delustering rayon, for example.

Using my novel dispersing agents, I have produced very desirable dispersions of oily materials, including oils, fats, and waxes, such as carnauba wax in water, petroleum hydrocarbons in water and many vegetable oils such as linseed, olive, neat's foot, castor, etc. in water.

Example 6

To 50 parts by weight of the viscous oil obtained by the interaction of maleic anhydride and olive oil under conditions similar to those described for instance in Example 1 (1 molecular equivalent of maleic anhydride to 1 molecular equivalent of olive oil), are added 5 parts by weight of isoamyl alcohol and the ingredients are refluxed for one-half hour. Any suitable alcohol may be used for this esterification, although the quantity of alcohol used will of course depend upon the particular alcohol. The reaction produces an acid ester. The product is neutralized with the theoretical amount of a base, preferably sodium or potassium hydroxide in concentrated aqueous solution. The resultant oily product is miscible with water in all proportions and is likewise miscible in all proportions with fatty oils and petroleum hydrocarbons.

The salt-ester as prepared above may be added to any suitable oily material such as a fatty oil or petroleum hydrocarbon to produce dispersion.

The acid ester may be added to the disperse phase before neutralization, and neutralization may be accomplished in the presence of the disperse phase.

Example 7

To a water-insoluble hydrocarbon, alcohol, or fatty oil, such as olive oil, castor oil, etc., or wax such as carnauba or candelilla, the soluble salt-ester of a nonconjugated unsaturated nonhydroxylated fatty oil condensation product as prepared in Example 6 is added until the salt-ester forms 20% of the mixture. This mixture is readily emulsified with water due to the presence of the water-soluble salt-ester, and will remain in suspension over an indefinitely long period of time. Such dispersions having a minimum quantity of dispersing agent have remained in suspension and shown no tendency to cream after two year's standing.

If the water-soluble oil as obtained in Example 7 is boiled with water for one to five hours, the product is not decomposed with the concomitant separation of oil.

The emulsion of olive oil dispersed by the water-soluble oil as obtained in Example 7 is very satisfactory as a wetting and softening agent for the textile, leather, and paper industries.

An ester of the condensation product may be hydrolyzed or partially hydrolyzed and then neutralized to produce a dispersing agent.

My novel dispersing agent is very desirable as a bodying agent in the making of polishes, cutting fluids and cosmetics.

The next four examples give specific illustrations of the product of the invention as a dispersing agent in polishes and cleaners. The actual material employed is the potassium isoamyl half ester of the condensation product of maleic anhydride and olive oil in which the quantity of maleic anhydride is 10% of the weight of the oil. The ingredients in each case are simply mixed in an emulsifier.

Example 8

A very desirable automobile polish has been produced using the following ingredients:

| | Parts by weight |
|---|---|
| Olive oil maleic complex, potassium isoamyl half ester | 10 |
| Mineral oil | 30 |
| Pumice powder | 5 |
| Amyl alcohol | 10 |
| Carnauba wax | 5 |
| Water | 40 |
| Total | 100 |

Example 9

A very desirable neutral shoe polish or shoe cream is obtained using the following composition:

| | Parts by weight |
|---|---|
| Olive oil maleic complex, potassium isoamyl half ester | 5 |
| Carnauba wax | 6 |
| Candelilla wax | 3 |
| Ceresin wax | 3 |
| Turpentine | 5 |
| Lemongrass oil | 0.5 |
| Light mineral oil | 1 |
| Water | 100 |
| Total | 123.5 |

Example 10

A very satisfactory furniture polish has the following composition:

| | Parts by weight |
|---|---|
| Olive oil maleic complex, potassium isoamyl half ester | 3 |
| Carnauba wax | 10 |
| Borax | 2 |
| Turpentine | 1 |
| Water | 90 |
| Total | 106 |

Example 11

A satisfactory leather cleaner and polish has been made using the following proportions:

| | Parts by weight |
|---|---|
| Olive oil maleic complex, potassium isoamyl half ester | 7.5 |
| Tri sodium phosphate | 0.5 |
| Beeswax | 6 |
| Carnauba wax | 6 |
| Turpentine | 36 |
| Pine oil | 4 |
| Turpineol | 2 |
| Water | 160 |
| Total | 222.0 |

In certain cases where the polishes are intended to leave a permanent film on the material being treated, such as leather and the like, it is desirable to use a water-soluble salt of a drying oil such as linseed oil as a dispersing agent. For such purpose the sodium acid salt of the maleic anhydride-linseed oil condensation product of the present invention is desirably incorporated with linseed oil and water in the proportion of from 10 to 20% of the sodium acid salt to the total weight of the oil being dispersed.

The oily dispersion material may contain water and be in the form of a dispersion. In many cases, however, it is desirable to put on the market dispersion material comprising a mixture of an oily material (fat, oil or wax) to be dispersed and the water-soluble salt of the condensation product of the present invention, omitting the water, and adding the water to create an actual dispersion at the point of use.

The dispersing agent of the present invention can carry resin at the time it is caused to disperse an oily material, or can be used to disperse a resin instead of or in addition to the oily material.

Example 12

Prior to dispersing a sodium acid salt of the condensation product of maleic anhydride and linseed oil, ester gum is dissolved in the condensation product up to about half the limit of solubility. The solution of ester gum in the sodium acid salt of the maleic condensation product of linseed oil is then used to disperse linseed oil in water for any suitable coating, polish or the like. Other paint, varnish and lacquer resins, for example phenolic resins, are suitably dissolved in the dispersing agent and then dispersed.

In addition to dispersing oily materials such as oils, fats, and waxes which may be mixed with it, the water-soluble dispersing agent has a detergent action, emulsifying and removing from the surfaces of materials being polished any oily materials such as oils, fats and waxes which may be present and thus exerting cleaning action.

At a number of points in the present application it is indicated that the salt or ester is formed by reaction with the base or alcohol after the condensation between an olefinic acid having less than ten carbon atoms in its carbon chain and a nonconjugated unsaturated nonhydroxylated aliphatic acid having from ten to twenty-four carbon atoms in its carbon chain or a nonhydroxylated salt or nonhydroxylated ester thereof. It will, however, be understood that in some cases the order of reaction may be varied without affecting the character of the product, and all such equivalent procedure is intended to be included within the scope of the claims.

At some places the nonconjugated unsaturated nonhydroxylated aliphatic acid, nonhydroxylated ester or nonhydroxylated salt, having from ten to twenty-four carbon atoms in the carbon chain is referred to as a fatty acid compound or compound having the fatty acid grouping.

It will be understood that some variations in desirable reaction temperatures and pressures will be found for different compounds.

Throughout the specification and claims, where I refer to nonconjugated unsaturated nonhydroxylated aliphatic acids having from ten to twenty-four carbon atoms in the carbon chain, or nonhydroxylated salts or nonhydroxylated esters thereof, I mean such acids, salts or esters as are unoxidized or nonpolymerized or not sufficiently oxidized or polymerized to interfere with the reactions disclosed herein. Thus, in referring to linseed oil, I mean the product generally known as such, raw or refined, and not linseed oil sufficiently oxidized or polymerized to prevent or seriously interfere with the formation of a condensation product at a double bond. In other words, I do not intend to exclude others from mere esterification of oxidized or polymerized fatty oils by maleic anhydride.

Many of the fish oils contain varying percentages of fatty alcohols, which will of course react with maleic anhydride to form esters. The esterified fatty alcohols may be allowed to remain in the condensation product, or the alcohols may be removed before condensation takes place.

It will be evident that the condensation product of my invention may be oxidized subsequent to condensation.

Where reference is made to poly-hydric alcohols, it is intended to include di-hydric alcohols. Under the designation poly-hydric alcohols, it is intended to include substituted poly-hydric alcohols such as glycol monoethyl ether. Reference to acids is intended to include acid anhydrides and half esters of acids. Reference to esters is intended to include partially completed esters such as half esters.

It will be understood that the condensation of minute amounts of the olefinic compound with the nonconjugated unsaturated nonhydroxylated fatty compound will not appreciably change the character of the latter. In general, at least 1% (based on the weight of the condensation product) of the olefinic compound should be combined with the nonconjugated unsaturated nonhydroxylated fatty compound in the product to insure a distinctive character of the product.

In view of my invention and disclosure variations and modifications to meet individual whim or particular need will doubtless become evident to others skilled in the art, to obtain all or part of the benefits of my invention without copying the exact process or product described, and I, therefore, claim all such in so far as they fall within the reasonable spirit and scope of my invention.

Having thus described my invention, what I claim as new and desire to secure by Letters Patent is:

1. An oily material dispersable in water and of the class consisting of oils, fats and waxes, comprising an oily substance of the class consisting of oils, fats and waxes insoluble in water and a water-soluble derivative of the condensation product of an acyclic olefinic acid having less than ten carbon atoms in its carbon chain, with the carbon chain of one of the group consisting of nonconjugated unsaturated nonhydroxylated aliphatic acids having from ten to twenty-four carbon atoms in their carbon chains, nonhydroxylated salts and nonhydroxylated esters thereof heated together at a temperature of at least 150° C. with continuance of the heating until a substantial quantity of the acyclic olefinic acid is combined at an intermediate point in the carbon chain in the one of the group.

2. An oily material dispersable in water and of the class consisting of oils, fats and waxes, comprising an oily substance of the class consisting of oils, fats and waxes insoluble in water and a water-soluble salt of the condensation product of an acyclic olefinic acid having less than ten carbon atoms in its carbon chain with the carbon chain of one of the group consisting of nonconjugated unsaturated nonhydroxylated aliphatic acids having from ten to twenty-four carbon atoms in their carbon chains, nonhydroxylated salts and nonhydroxylated esters thereof heated together at a temperature of at least 150° C. with continuance of the heating until a substantial quantity of the acyclic olefinic acid is combined at an intermediate point in the carbon chain in the one of the group.

3. An oily material dispersable in water and of the class consisting of oils, fats and waxes, comprising an oily substance of the class consisting of oils, fats and waxes insoluble in water and a water-soluble salt of the condensation product of an acyclic olefinic acid having less than ten carbon atoms in its carbon chain with the carbon chain of a nonconjugated unsaturated nonhydroxylated glyceride oil heated together at a temperature not less than 150° C. and in excess of the ordinary boiling point of the acyclic olefinic acid with return condensation and for a time sufficient to produce a substantial amount of the condensation product, as the dispersing agent.

4. An oily material dispersable in water, and of the class consisting of oils, fats and waxes, comprising an oily substance of the class consisting of oils, fats and waxes insoluble in water and a water-soluble salt of the condensation product of an acyclic olefinic acid having less than ten carbon atoms in its carbon chain with the carbon chain of a nonconjugated unsaturated nonhydroxylated non-drying glyceride oil, heated together at a temperature of at least 150° C. with continuance of the heating until a substantial quantity of the acyclic olefinic acid is combined at an intermediate point in the carbon chain of the fatty acid of the oil, as the dispersing agent.

5. An oily material dispersable in water and of the class consisting of oils, fats and waxes, comprising an oily substance of the class consisting of oils, fats and waxes insoluble in water and a water-soluble salt of the condensation product of an acyclic olefinic acid having less than ten carbon atoms in its carbon chain with the carbon chain of a nonconjugated unsaturated nonhydroxylated drying glyceride oil, heated together at a temperature of at least 150° C. with continuance of the heating until a substantial quantity of the acyclic olefinic acid is combined at an intermediate point in the carbon chain of the fatty acid of the oil, as the dispersing agent.

6. An oily material dispersable in water and of the class consisting of oils, fats and waxes, comprising an oily substance of the class consisting of oils, fats and waxes insoluble in water and a water-soluble salt of the condensation product of maleic anhydride with the carbon chain of one of the group consisting of nonconjugated unsaturated nonhydroxylated aliphatic acids having from ten to twenty-four carbon atoms in their carbon chains, nonhydroxylated salts and nonhydroxylated esters thereof, heated together at a temperature not less than 150° C. and in excess of the ordinary boiling point of the maleic anhydride with return condensation and for a time sufficient to produce a substantial amount of the condensation product, as the dispersing agent.

7. An oily material dispersable in water and of the class consisting of oils, fats and waxes, comprising an oily substance of the class consisting of oils, fats and waxes insoluble in water and a water-soluble salt of the condensation product of maleic anhydride with the carbon chain of an oil predominantly consisting of glycerides of linoleic and oleic acids, heated together at a temperature of at least 150° C. with continuance of heating until a substantial quantity of maleic anhydride is combined at an intermediate point in the carbon chain of the oil, as the dispersing agent.

8. An oily material dispersable in water and of the class consisting of oils, fats and waxes, comprising an oily substance of the class consisting of oils, fats and waxes insoluble in water and a water-soluble salt of the condensation product of maleic anhydride with the carbon chain of a nonconjugated unsaturated nonhydroxylated non-drying glyceride oil, heated together at a temperature not less than 150° C. and in excess of the ordinary boiling point of the maleic anhydride with return condensation and for a time sufficient to produce a substantial amount of the condensation product, as the dispersing agent.

9. An oily material dispersable in water and of the class consisting of oils, fats and waxes, comprising an oily substance of the class consisting of oils, fats and waxes insoluble in water and a water-soluble salt of the condensation product of maleic anhydride with the carbon chain of a drying oil predominantly consisting of glycerides of linoleic and oleic acids, heated together at a temperature of at least 150° C. with continuance of heating until a substantial quantity of maleic anhydride is combined at an intermediate point in the carbon chain of the oil, as the dispersing agent.

10. An oily material dispersable in water and of the class consisting of oils, fats and waxes, comprising an oily substance of the class consisting of oils, fats and waxes insoluble in water and a water-soluble salt of the condensation product of maleic anhydride and linseed oil, heated together at a temperature not less than 150° C. and in excess of the ordinary boiling point of the maleic anhydride with return condensation and for a time sufficient to produce a substantial amount of the condensation product, as the dispersing agent.

11. An oily material dispersable in water and of the class consisting of oils, fats and waxes, comprising an oily substance of the class consisting of oils, fats and waxes insoluble in water and a water-soluble derivative of the condensation product of maleic anhydride and olive oil, heated together at a temperature of at least 150° C. with continuance of heating until a substantial quantity of maleic anhydride is combined at an intermediate point in the carbon chain of the oil, as the dispersing agent.

12. An oily material dispersable in water comprising glyceride oil and a water-soluble salt of the condensation product of an acyclic olefinic acid having less than ten carbon atoms in its carbon chain with the carbon chain of one of the group consisting of nonconjugated unsaturated nonhydroxylated aliphatic acids having from ten to twenty-four carbon atoms in their carbon chains, nonhydroxylated salts and nonhydroxylated esters thereof heated together at a temperature of at least 150° C. with continuance of the heating until a substantial quantity of the acyclic olefinic acid is combined at an intermediate point in the carbon chain in the one of the group.

13. An oily material dispersable in water comprising mineral oil and a water-soluble salt of the condensation product of an acyclic olefinic acid having less than ten carbon atoms in its carbon chain with the carbon chain of one of the group consisting of nonconjugated unsaturated nonhydroxylated aliphatic acids having from ten to twenty-four carbon atoms in their carbon chains, nonhydroxylated salts and nonhydroxylated esters thereof heated together at a temperature of at least 150° C. with continuance of the heating until a substantial quantity of the acyclic olefinic acid is combined at an intermediate point in the carbon chain in the one of the group.

14. An oily material dispersable in water comprising wax insoluble in water and a water-soluble salt of the condensation product of an acyclic olefinic acid having less than ten carbon atoms in its carbon chain with the carbon chain of one of the group consisting of nonconjugated unsaturated nonhydroxylated aliphatic acids having from ten to twenty-four carbon atoms in their carbon chains, nonhydroxylated salts and nonhydroxylated esters thereof heated together at a temperature of at least 150° C. with continuance of the heating until a substantial quantity of the acyclic olefinic acid is combined at an intermediate point in the carbon chain in the one of the group.

15. An oily material dispersable in water comprising carnauba wax and a water-soluble salt of the condensation product of an acyclic olefinic acid having less than ten carbon atoms in its carbon chain with the carbon chain of one of the group consisting of nonconjugated unsaturated nonhydroxylated aliphatic acids having from ten to twenty-four carbon atoms in their carbon chains, nonhydroxylated salts and nonhydroxylated esters thereof heated together at a temperature not less than 150° C. and in excess of the ordinary boiling point of the acyclic olefinic acid with return condensation and for a time sufficient to produce a substantial amount of the condensation product, as the dispersing agent.

16. An oily material dispersable in water and of the class consisting of oils, fats and waxes, comprising an oily substance of the class consisting of oils, fats and waxes insoluble in water and a salt with a base of the class consisting of alkali metal bases and organic bases, of the condensation product of an acyclic olefinic acid having less than ten carbon atoms in its carbon chain, with the carbon chain of one of the group consisting of nonconjugated unsaturated nonhydroxylated aliphatic acids having from ten to twenty-four carbon atoms in their carbon chains, nonhydroxylated salts and nonhydroxylated esters thereof, in the proportions of one molecular equivalent of olefinic acid to one molecular equivalent of one of the group, heated together at a temperature not less than 150° C. and in excess of the ordinary boiling point of the acyclic olefinic acid with return condensation and for a time sufficient to produce a substantial amount of the condensation product, as the dispersing agent.

EDWIN T. CLOCKER.